(12) United States Patent
Yue et al.

(10) Patent No.: US 8,873,740 B2
(45) Date of Patent: *Oct. 28, 2014

(54) ENHANCED ECHO CANCELLATION

(71) Applicant: Apple Inc., Cupertino, CA (US)

(72) Inventors: Peter Yue, St. Laurent (CA); Rafi Rabipour, Cote Saint-Luc (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/659,374

(22) Filed: Oct. 24, 2012

(65) Prior Publication Data

US 2013/0108036 A1 May 2, 2013

Related U.S. Application Data

(63) Continuation of application No. 12/258,723, filed on Oct. 27, 2008, now Pat. No. 8,320,553.

(51) Int. Cl.
*H04M 9/08* (2006.01)
*H04B 1/38* (2006.01)
*H04B 3/20* (2006.01)
*H04B 3/23* (2006.01)

(52) U.S. Cl.
CPC . *H04B 3/23* (2013.01); *H04B 3/234* (2013.01)
USPC ............. 379/406.05; 455/570; 370/289

(58) Field of Classification Search
None
See application file for complete search history.

(56) References Cited

U.S. PATENT DOCUMENTS

| 5,428,605 | A | 6/1995 | Andre |
| 5,606,550 | A | 2/1997 | Jangi |
| 6,181,794 | B1 | 1/2001 | Park et al. |
| 6,522,746 | B1 | 2/2003 | Marchok et al. |
| 7,050,576 | B2 | 5/2006 | Zhang et al. |
| 7,505,594 | B2 | 3/2009 | Mauro |

(Continued)

FOREIGN PATENT DOCUMENTS

| EP | 0 194 738 A1 | 9/1986 |
| EP | 0 604 948 | 7/1994 |

OTHER PUBLICATIONS

First Office Action and translation thereof in related Chinese Patent Application No. 200910208648.7, Mar. 11, 2013, pp. 1-17.
European Search Report for EP 09 17 4214, mailed Feb. 24, 2010, pp. 1-3.
Office Action from Chinese Application No. 200910208648.7, mailed Dec. 9, 2013, English and Chinese versions, pp. 1-15.

*Primary Examiner* — Fan Tsang
*Assistant Examiner* — Jeffrey Lytle
(74) *Attorney, Agent, or Firm* — Meyertons, Hood, Kivlin, Kowert & Goetzel, P.C.

(57) ABSTRACT

The present invention provides for echo cancellation circuitry and variable rate encoding circuitry to cooperate with one another to effectively provide comfort noise in an effective and efficient manner. The echo cancellation circuitry will use far-end signals to generate estimated echo signals, which correspond to the actual echo signals appearing in near-end signals. The estimated echo signals are essentially subtracted from the near-end signals in an effort to remove the actual echo signals from the near-end signals. The echo cancellation circuitry will monitor any residual echo signals in the resulting processed near-end signals and provide residual echo control signals that are indicative of whether the residual echo signals should be replaced with comfort noise. The residual echo control signals are used at least in part by the variable rate encoding circuitry to determine the encoding rate to use for encoding different portions of the processed near-end signals.

18 Claims, 4 Drawing Sheets

(56) References Cited

U.S. PATENT DOCUMENTS

| | | | |
|---|---|---|---|
| 7,558,729 | B1 | 7/2009 | Benyassine et al. |
| 7,610,197 | B2 | 10/2009 | Cruz-Zeno et al. |
| 7,693,708 | B2 | 4/2010 | Gournay et al. |
| 7,738,487 | B2 | 6/2010 | El-Maleh et al. |
| 2001/0016811 | A1* | 8/2001 | Thyssen et al. ............... 704/215 |
| 2003/0202475 | A1 | 10/2003 | Chen et al. |
| 2005/0055201 | A1* | 3/2005 | Florencio et al. ............ 704/214 |
| 2006/0100859 | A1* | 5/2006 | Jelinek et al. ................. 704/201 |
| 2007/0294087 | A1 | 12/2007 | Lakaniemi |

\* cited by examiner

FIG. 4

ENHANCED ECHO CANCELLATION

PRIORITY CLAIM

This application is a continuation application of U.S. patent application Ser. No. 12/258,723, titled "Enhanced Echo Cancellation", filed on Oct. 27, 2008, which is hereby incorporated by reference in its entirety as though fully and completely set forth herein.

FIELD OF THE INVENTION

The present invention relates to echo cancellation, and in particular to efficiently controlling an encoder to provide comfort noise in association with an echo cancellation process.

BACKGROUND OF THE INVENTION

Public telephone networks often use a two-wire subscriber line or loop to connect a subscriber's telephone to the core network. The subscriber loop generally carries analog signals and is coupled to the subscriber line interface of the core network via a device referred to as a hybrid circuit. The subscriber line interface is often a four-wire interface, and as such, the hybrid circuit provides a two-wire-to-four-wire interface between the two-wire subscriber loop and the four-wire subscriber line interface. Most hybrid circuits are provided at or in association with a switching office, public branch exchange (PBX), or the like.

The hybrid circuit is a major source of echoes in public telephone networks. The echo results from an electrical mismatch between the subscriber loop and the hybrid circuit at the subscriber line interface. When a far-end user is talking, the far-end user's speech signals are delivered across the public telephone network, through the hybrid circuit serving the near-end user, and to a near-end user via the subscriber loop. Given the electrical mismatch at the hybrid circuit, the far-end user's speech signals bleed into the signals being provided from the near-end user back to the far-end user. The far-end user's speech signals that bleed into near-end user's signals cause the echo. If such echo is not cancelled, the far-end user will hear an echo of their own voice when they are talking to the near-end user.

To deal with the undesired echo, echo cancellers are employed to effectively cancel the far-end user's echo from the near-end user's signals that are being delivered to the far-end user. A primary component in an echo canceller is an adaptive filter, which primarily functions to estimate the echo, replicate the echo, and subtract the estimated echo from the near-end user's signals. Unfortunately, it is difficult to remove all of the far-end user's echo from the near-end user's signals. The remaining echo is referred to as residual echo, and is considered to be caused by the non-linear nature of the overall communication system. Accordingly, a non-linear processor (NLP) is employed to remove the residual echo when possible.

When the near-end user is not talking, the NLP is activated to remove or significantly attenuate the near-end user's signals, which include the residual echo of the far-end user. As such, the far-end user will not hear their echo as they talk. However, the effective removal of the near-end user's signals, which represent the background noise of the near-end user when the near-end user is not talking, is also removed. The resulting quietness that is perceived by the far-end user is disconcerting and is often mistaken as the connection being dropped or lost by the far-end user.

To avoid the distracting changes in perceived background noise by the far-end user, the NLP may employ a comfort noise generator to provide comfort noise when the NLP is activated to remove the residual echo of the far-end user. The comfort noise is preferably generated to have the same spectral quality and power level as the actual background noise in the near-user's signal. As such, the comfort noise provided to the far-end user when the near-end user's signals are removed by the NLP sound the same to the far-end user as the near-end user's background noise that is provided to the far-end user when the NLP is not activated.

Unfortunately, estimating and generating the comfort noise is computationally intensive and adds complexity to the echo cancellation processing. Further, the output of the echo canceller is often delivered to a downstream speech encoder that is used to efficiently encode the near-end user's signals. In general, the speech encoder attempts to identify active speech and inactive speech in the near-end user's signals. For instance, in CDMA systems, the active speech portions of the near-end user's signals are encoded at a higher rate, while the inactive speech portions, which represent periods when the near-end user is not talking, are encoded at much lower rates. In GSM/UMTS systems, the inactive speech portion is not transmitted through a Discontinuous Transmission (DTX) mechanism.

The systematic transitions between the actual near-end user signals and the comfort noise provided by the comfort noise generator during periods of silence are often difficult to efficiently handle by the speech encoder. The comfort noise may be mistaken for the onset of an active speech spurt and encoded at a higher than needed rate. Further, excessive switching between low-rate encoding and high-rate encoding often occurs, resulting in unpleasant clicking sounds being heard by the far-end user. Accordingly, there is a need for an echo cancellation technique that provides effective echo cancellation and supports efficient encoding by a downstream speech encoder.

SUMMARY OF THE INVENTION

The present invention provides for echo cancellation circuitry and variable rate encoding circuitry to cooperate with one another to effectively provide comfort noise in an effective and efficient manner. In one embodiment, the echo cancellation circuitry is adapted to receive near-end signals from a near-user and far end signals from a far end-user, wherein the near-end signals include actual echo signals resulting from some of the far-end signals being injected into the near-end signals. The echo cancellation circuitry will use the far-end signals to generate estimated echo signals, which correspond to the actual echo signals. The estimated echo signals are essentially subtracted from the near-end signals in an effort to remove the actual echo signals from the near-end signals. The resulting signals are referred to as processed near-end signals, which have most of the actual echo signals removed, but may still include residual echo signals. The echo cancellation circuitry will monitor the residual echo signals in the processed near-end signals and provide residual echo control signals that are indicative of whether the residual echo signals should be replaced with comfort noise.

The residual control echo control signals are used at least in part by the variable rate encoding circuitry to determine the encoding rate to use for encoding different portions of the processed near-end signals. When the residual echo control signal indicates that the residual echo signals should be replaced with comfort noise, the variable rate encoding circuitry will at least consider the residual echo control signals when determining the appropriate encoding rate. In certain instances, when the residual echo control signal indicates that the residual echo signals should be replaced with comfort noise, the variable rate, including DTX, encoding circuitry will encode the processed near-end signals at a lower encoding rate, wherein encoding at the lower encoding rate provides an encoded near-end signals that corresponds to background noise in the near-end signals. In the case of DTX operation being disabled, the speech encoder can still take advantage of the characteristics of the noise to further simplify the encoding algorithm. It is well known in the speech processing community that there is no pitch information in noise. As a consequence, the pitch search, such as an adaptive codebook search, operation in the encoding algorithm may be optionally bypassed. Accordingly, the encoded near-end signals effectively provide comfort noise to provide to the far-end user.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
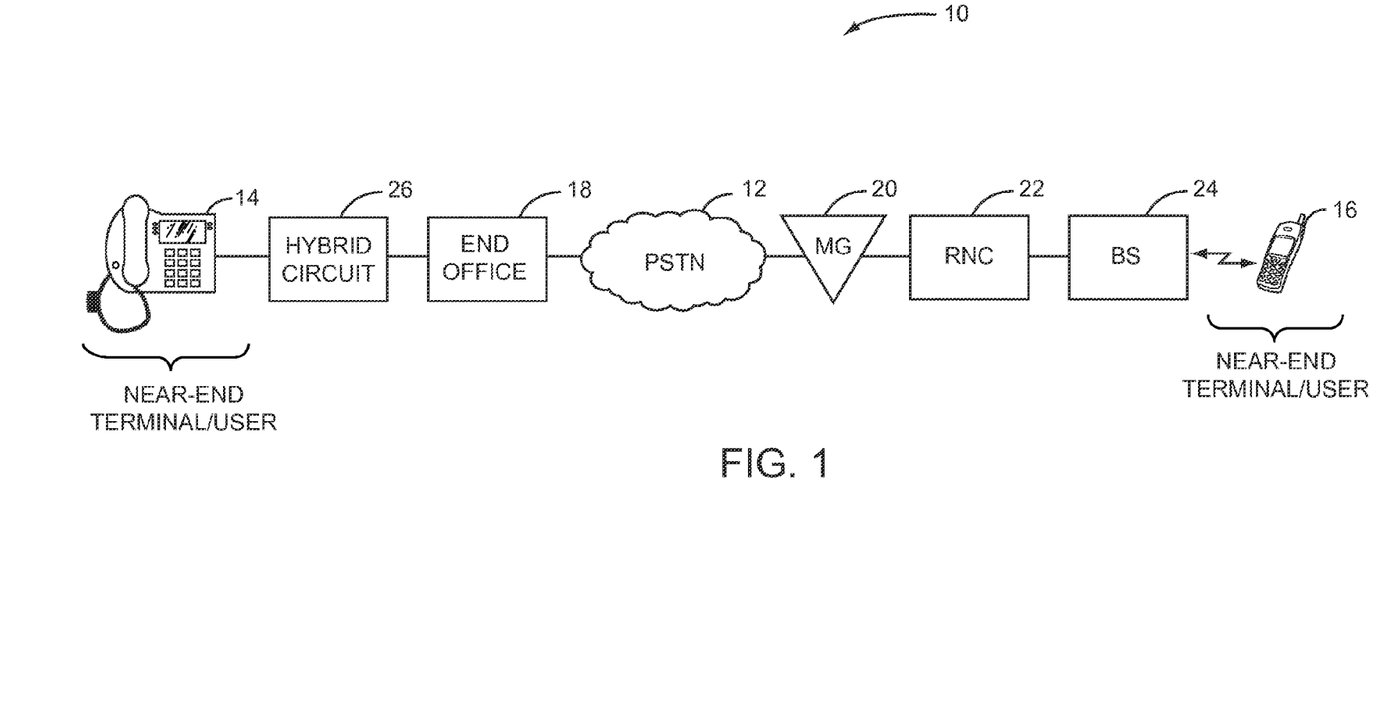
FIG. 1 is a block representation of a communication environment according to one embodiment of the present invention.

With reference to FIG. 1, an exemplary communication environment 10 in which certain embodiments of the present invention may be practiced is illustrated. The communication environment 10 is centered about the public switched telephone network (PSTN) 12, which is capable of facilitating communications between a near-end terminal 14 and a far-end terminal 16. The near-end terminal 14 is associated with a near-end user, and the far-end terminal 16 is associated with a far-end user, such that the near-end user and far-end user may talk to each other over a connection established between the near-end terminal 14 and the far-end terminal 16 via the PSTN 12. As illustrated, the near-end terminal 14 is served by an end office 18, which may represent a central office, private branch exchange (PBX), or the like. Generally, the end office 18 resides at the edge of the core of the PSTN 12. The far-end terminal 16 is served by a media gateway (MG) 20, radio network controller (RNC) 22, and a base station (BS) 24. The base station 24 supports wireless communications with the mobile, far-end terminal 16, and the radio network controller 22 may serve any number of base stations 24 to facilitate cellular communications within the cellular access network. Access to the PSTN 12 is provided through the media gateway 20, which will provide the requisite interworking between the cellular access network and the core portion of the PSTN 12.

Notably, the far-end terminal 16 may represent virtually any type of communication terminal, including a packet-based or circuit-switched communication terminal in a wired or wireless access network. The cellular access network that is illustrated as serving the far-end terminal 16 is merely exemplary. The near-end terminal 14 may be served by a traditional two-wire subscriber line or loop, which is terminated at a hybrid circuit 26 that is coupled to the end office 18. The hybrid circuit 26 generally provides a two-wire-to-four-wire interface between the two-wire subscriber loop and a four-wire subscriber line interface (not shown) that is provided by the end office 18.

As indicated above, the hybrid circuit 26 inherently injects echo in communications involving the near-end terminal 14. The echo results from an electrical mismatch between the subscriber loop and the hybrid circuit 26 at the subscriber line interface. When the far-end user is talking, the far-end user's speech signals are delivered across the PSTN 12, through the hybrid circuit 26, and to the near-end terminal 14 via the subscriber loop. Given the electrical mismatch at the hybrid circuit 26, the far-end user's speech signals bleed into the signals being provided from the near-end terminal 14 back to the far-end terminal 16. The far-end user's speech signals that bleed into the near-end user's signals cause the echo, which if not cancelled, will result in the far-end user hearing an echo of their own voice when they are talking to the near-end user. Notably, the terms "near-end" and "far-end" are merely used for clarity in identifying the terminal or user being described or referenced at any given time. For the purposes of description, the near-end terminal 14, and thus the near-end user, are substantially directly served by the hybrid circuit 26, wherein the far-end terminal 16, and thus the far-end user, are served by the opposite end of the communication environment 10, and in this instance, by the base station 24.

To address the undesired echo caused by the hybrid circuit 26, echo cancellers are employed to effectively cancel the far-end user's echo from the near-end user's signals that are being delivered to the far-end user. A primary function of an echo canceller is to estimate the echo, replicate the echo, and subtract the estimated echo from the near-end user's signals. In order to highlight the concepts of the present invention, an overview of traditional echo cancellation circuitry 28 is provided in association with FIG. 2. Notably, the echo cancellation circuitry 28 is associated with voice encoding and decoding (vocoder) circuitry 30, which may be implemented in a digital signal processor (DSP) located in a service node in the communication environment 10, such as the media gateway 20, RNC 22, base station 24, or other appropriate service node residing in a communication path that includes a hybrid circuit 26. As depicted, the echo cancellation circuitry 28 has four ports. The near-end user's signals are generally referenced as $S_{IN}$, and are deemed to include the echo of the far-end user. The echo path that causes the echo is illustrated as running through the hybrid circuit 26. The far-end user's signals are generally referenced as $R_{IN}$ or $R_{OUT}$, depending on whether the far-end user's signals are being received or being provided by the echo cancellation circuitry 28. Notably, the echo cancellation circuitry 28 is deemed not to operate on the far-end user's signals for the purposes of clarity and conciseness; however, those skilled in the art will recognize that the functionality of the echo cancellation circuitry 28 and the vocoder circuitry 30 may be provided for communications flowing in either direction in the communication path.

Figure 2:
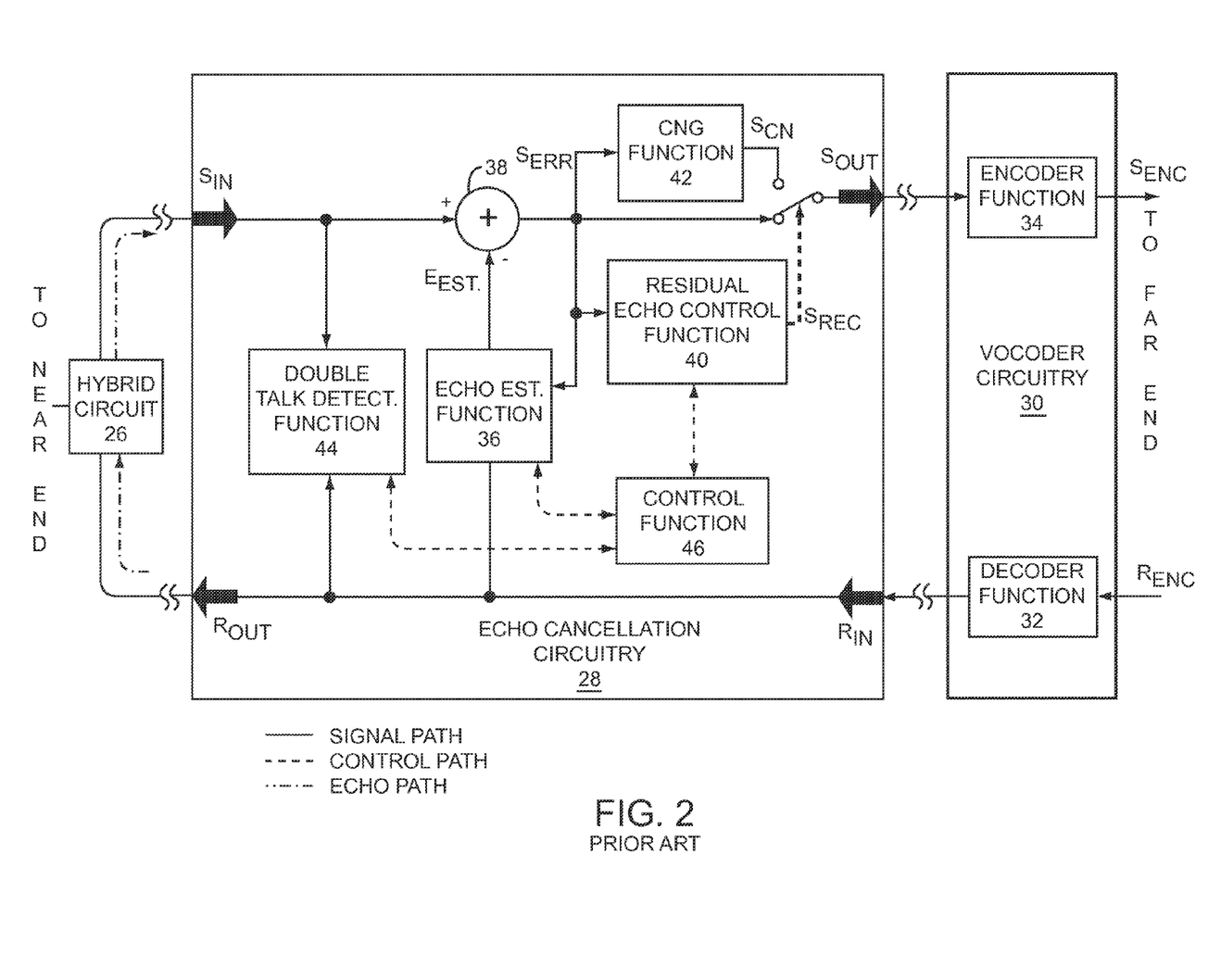
FIG. 2 illustrates echo cancellation and vocoder circuitry according to the prior art.

At a high level, encoded far-end signals $R_{ENC}$ are received at a decoder function 32 of the vocoder circuitry 30, are decoded to provide far-end signals $R_{IN}$, and are passed to an input port of the echo cancellation circuitry 28. Corresponding far-end audio signals $R_{OUT}$ are provided from an output port of the echo cancellation circuitry 28 to the hybrid circuit 26, which will pass the far-end audio signals $R_{OUT}$ toward the near-end terminal 14. Near-end audio signals from the near-end terminal 14 are received at the hybrid circuit 26 and are passed to an input port of the echo cancellation circuitry 28. As described, a portion of the far-end signals $R_{OUT}$ are injected into the near-end audio signals $S_{IN}$. As such, the near-end audio signals $S_{IN}$ include the original near-end audio signals provided by the near-end user, as well as some of the far-end audio signals $R_{OUT}$, which represent the echo to be cancelled by the echo cancellation circuitry 28. The echo cancellation circuitry 28 will attempt to cancel the echo in the near-end audio signals $S_{IN}$, and provide processed near-end signals $S_{OUT}$, which are presented to an encoder function 34 of the vocoder 30. The encoder function 34 will encode the processed near-end audio signals $S_{OUT}$ to generate encoded near-end signals $S_{ENC}$, which are delivered toward the far-end terminal 16.

The echo cancellation circuitry 28 generally provides echo cancellation in two steps. The first echo cancellation step involves a linear echo cancellation process, wherein the far-end user's echo is estimated, replicated, and then subtracted from the near-end signal $S_{IN}$, which includes the far-end user's actual echo. Generally, the near-end audio signal $S_{IN}$ is a quantized signal, and the echo cancellation circuitry 28 processes the near-end audio signal $S_{IN}$ on a sample-by-sample basis. In particular, the linear echo cancellation is provided by an echo estimation function 36 and a summing function 38. In most instances, the echo estimation function 36 is an adaptive filter, which receives the far-end signal $R_{IN}$, and passes the far-end signal $R_{IN}$ through an adaptive transfer function to provide an estimated echo signal $E_{EST}$. The estimated echo signal $E_{EST}$ is subtracted from the near-end signal $S_{IN}$ by the summing circuitry 38 to provide an error signal $S_{ERR}$. The error signal $S_{ERR}$ is fed back to the echo estimation function 36, and thus the adaptive filter, which will adjust the filter coefficients for the adaptive transfer function in an iterative manner in an effort to substantially cancel the far-end user's echo from the near-end signal $S_{IN}$. Although linear echo cancellation provided by the echo estimation function 36 and the summing circuitry 38 is generally continuously provided, selection of the filter coefficients for the adaptive transfer function are generally provided only when the far-end user is actively talking and when the near-end user is not actively talking. This is because speech activity in the near-end signal $S_{IN}$ may induce error in selection of the parameters for the adaptive transfer function. Again, the goal of the adaptive transfer function is to process the far-end signals $R_{IN}$ to provide an estimated echo signal, which substantially correlates to the actual far-end user echo in the near-end signals $S_{IN}$. Accordingly, the coefficients for the adaptive transfer function are essentially held constant when the near-end user is talking.

Unfortunately, the non-linear characteristics of communications in general prohibit the echo estimation function 36 from completely eliminating the echo of the far-end user. The echo that remains in the near-end signal $S_{IN}$ after being filtered by the echo estimation function 36 and the summing circuitry 38 is referred to as residual echo. When there is no speech activity in the near-end signals $S_{IN}$, such as when the near-end user is not talking, the residual echo is removed through a non-linear echo cancellation process, which is often referred to as non-linear processing (NLP). As illustrated, the non-linear processing or like residual echo cancellation is provided by a residual echo control function 40. The residual echo control function 40 operates in conjunction with a comfort noise generation (CNG) function 42, and dynamically switches between providing the error signal $S_{ERR}$ and a comfort noise signal $S_{CN}$ as the processed near-end signal $S_{OUT}$. The CNG function 42 may analyze the error signal $S_{ERR}$ or other function of the near-end audio signal $S_{IN}$, to determine the general spectrum and level of the background noise that is normally present in the near-end signal $S_{IN}$ and generate comfort noise that is deemed similar to or sufficiently audibly the same as the actual background noise from the near-end signal $S_{IN}$.

When the CNG function 42 is estimating the background noise in the near-end audio signal $S_{IN}$ (or error signal $S_{ERR}$), neither the near-end user nor the far-end user should be talking. Both the near-end and far-end users need to be silent because speech activity or echo energy may result in an improper estimation of the background noise, and thus generation of an appropriate comfort noise signal $S_{CN}$. When the near-end user is not talking, and generally when the residual echo exceeds a defined threshold, the residual echo control function 40 will engage the CNG function 42, and thereby provide the appropriate comfort noise signal $S_{CN}$ as the processed near-end signal $S_{OUT}$, which is delivered to the encoder function 34 of the vocoder circuitry 30. When the near-end user is talking, or the residual echo is below a defined threshold, the residual echo control function 40 will pass the error signal $S_{ERR}$, which represents the near-end signal $S_{IN}$ after linear echo cancellation, as the processed near-end signal $S_{OUT}$. Accordingly, when the near-end user is talking, linear echo cancellation is provided, but non-linear echo cancellation is not provided. Both linear and non-linear echo cancellation may be provided when the near-end user is not talking.

To aid in determining when the near-end user is talking, as well as when the far-end user is talking, a double talk detection function 44 is provided. The double talk detection function 44 is capable of monitoring the near-end signal $S_{IN}$ as well as the far-end signal $R_{IN}$ to determine when both the near-end user and the far-end user are talking. Directly or through an appropriate control function 46, the double talk detection function 44 is able to detect when the near-end and far-end users are talking and alert the echo estimation function 36 as well as the residual echo control function 40 of the double talk condition. As indicated above, the echo estimation function 36 may slow or stop any adaptation of the adaptive filter during periods of double talk. Further, the residual echo control function 40 will not engage the CNG function 42 to provide the comfort noise signal as the processed near-end signal $S_{OUT}$ during periods of double talk. Instead, the error signal $S_{ERR}$ is provided as the processed near-end signal $S_{OUT}$. The selection between the error signal $S_{ERR}$ and the comfort noise signal $S_{CN}$ may be controlled by a residual echo control signal $S_{REC}$, which is used to control the logical switch that selectively couples the error signal $S_{ERR}$ or the comfort noise signal $S_{CN}$ to the output port of the echo cancellation circuitry 28 from which the processed near-end signal $S_{OUT}$ is provided.

As indicated, the processed near-end signal $S_{OUT}$ is composed of speech portions and comfort noise portions. Within the speech portions there may be active (talking) speech portions separated by non-active (or silent) speech portions. The encoder function 34 of the vocoder circuitry 30 will encode the processed output signal $S_{OUT}$. Generally, the encoder function 34 employs variable bit rate (VBR) or discontinuous transmission (DTX) encoding techniques, wherein, depending on the signal content, different levels or rates of encoding may be employed in traditional fashion. In general, active speech portions are encoded at higher rates, and non-active speech portions are encoded at lower rates or as silence descriptors (SIDs) in the case of DTX operating mode. Notably, the use of silence descriptors is considered a lower rate encoding process. Comfort noise portions will generally appear as non-active speech, and as such may be encoded in the same fashion as non-active speech portions. Many encoding processes will employ a comfort noise generation function during low-rate encoding, including DTX. As such, the result of the low-rate encoding is a low bit rate signal that represents or includes comfort noise, which was estimated by the encoder function 34. Notably, traditional encoder functions 34 cannot identify the comfort noise signal $S_{CN}$ that resides in the processed near-end signals $S_{OUT}$. In essence, the encoder function 34 cannot determine the difference between a non-active speech portion and an overall speech portion in a comfort noise portion. Accordingly, both the echo cancellation circuitry 28 and the vocoder circuitry 30 are estimating and generating comfort noise signals, and determining when to provide the comfort noise signals as or within those signals that represent the signals emanating from the near-end user.

Figure 3:
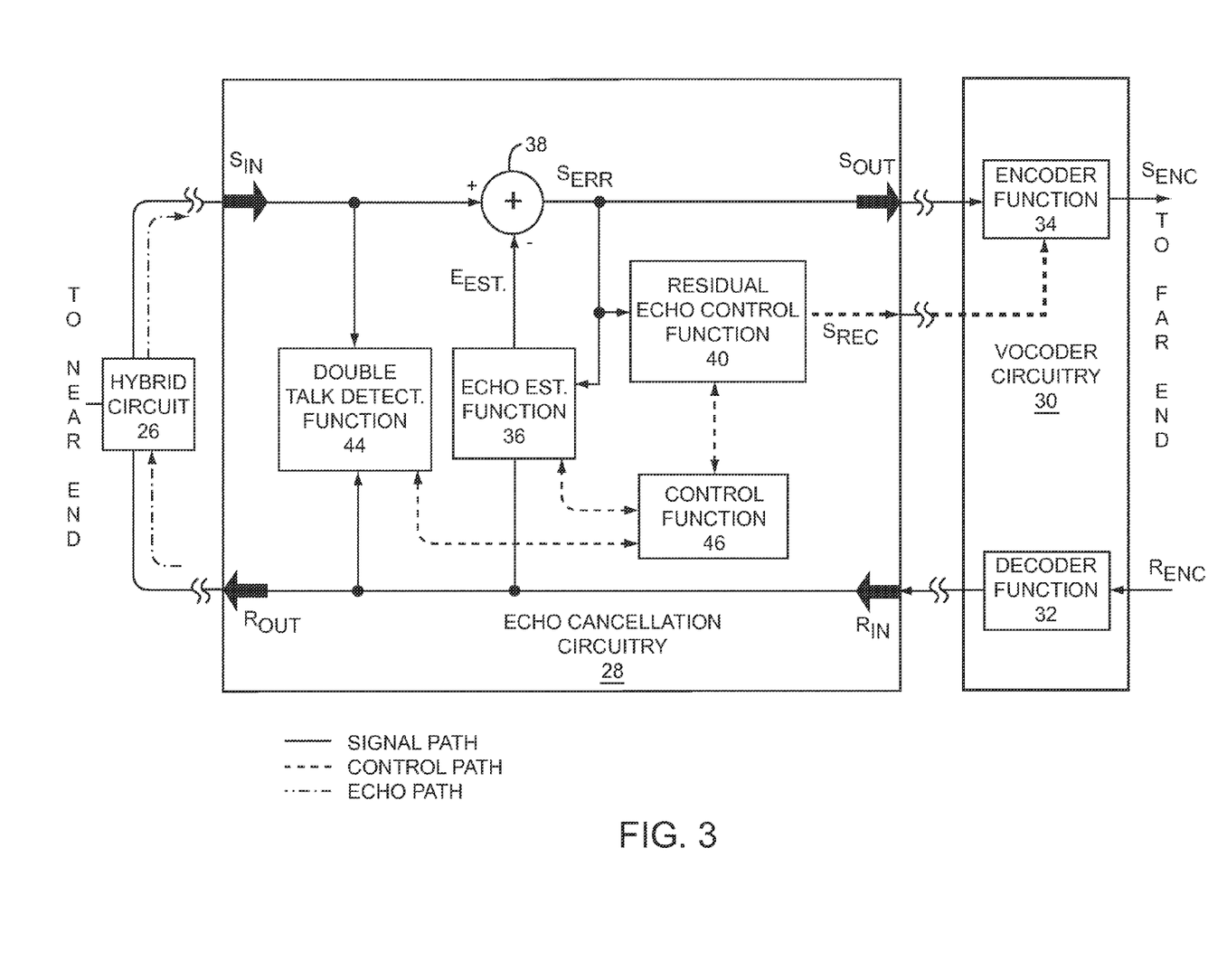
FIG. 3 illustrates echo cancellation and vocoder circuitry according to one embodiment of the present invention.

The present invention effectively modifies the architecture of the echo cancellation circuitry 28 as illustrated in FIG. 3. In particular, the CNG function 42 is no longer required, and the residual echo control function 40 is configured to provide a residual echo control signal $S_{REC}$ to the encoder function 34. The residual echo control signal $S_{REC}$ is not provided to a logical switch that selects between using the error signal $S_{ERR}$ and the comfort noise signal $S_{CN}$ to provide as the processed near-end signal $S_{OUT}$. Instead, the processed near-end signal $S_{OUT}$ may generally correspond to the error signal $S_{ERR}$, which again represents the near-end signal $S_{IN}$ after the linear echo cancellation process. The non-linear processing is not provided solely in the echo cancellation circuitry 28. Instead, the residual echo control function 40 determines when a non-linear echo cancellation process is required and provides a corresponding instruction to the encoder function 34 using the residual echo control signal $S_{REC}$. Accordingly, the substantial computational overhead associated with estimating, generating, and selectively placing the comfort noise signal $S_{CN}$ in the processed near-end signal $S_{OUT}$ is avoided. Since the encoder function 34 was already providing a redundant comfort noise generation function, the encoder function 34 may use the residual echo control signal $S_{REC}$ to determine when comfort noise generation is required. Again, comfort noise generation by the encoder function 34 is provided by or in association with low bit rate encoding in a variable bit rate encoding process. Accordingly, from the echo cancellation circuitry's perspective, traditional linear echo cancellation is provided, but traditional non-linear echo cancellation using non-linear processing techniques is not directly provided. The echo cancellation circuitry 28 is used to determine when comfort noise may be needed and will instruct the encoder function 34 of the vocoder circuitry 30 accordingly.

Figure 4:
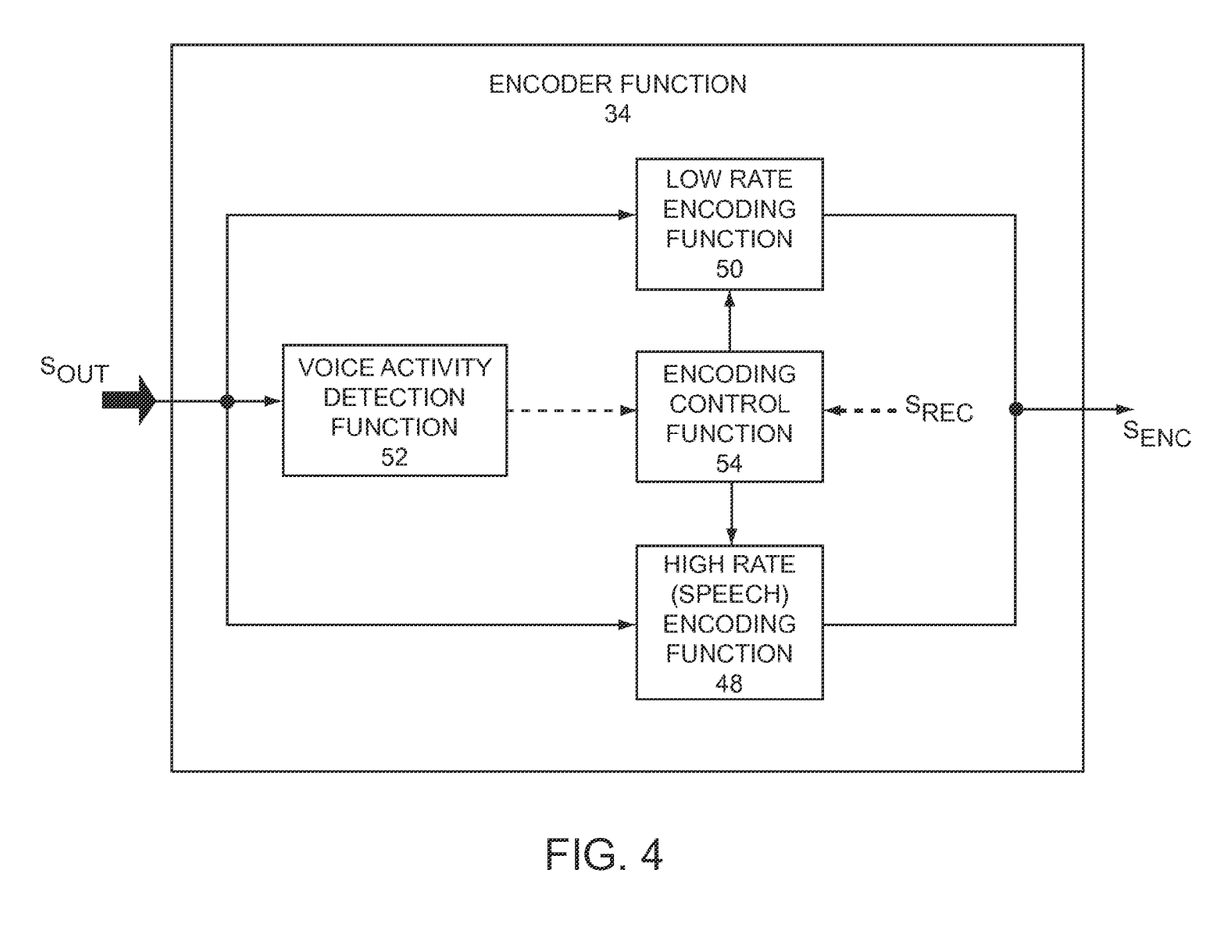
FIG. 4 illustrates an encoder function according to one embodiment of the present invention.

With reference to FIG. 4, an exemplary encoder function 34 is described according to one embodiment of the present invention. Although the encoder function 34 may provide various encoding techniques, the following example corresponds to an adaptive multi-rate (AMR) encoding process, such as that employed in Global System for Mobile communications (GSM) and third generation Wideband Code Division Multiple Access (WCDMA) systems. Although the echo cancellation circuitry 28 generally operates on a sample-by-sample basis, the encoder function 34 will encode the processed near-end signal $S_{OUT}$ on a frame-by-frame basis. In this illustration, assume each frame includes 160 samples of the processed near-end signal $S_{OUT}$. The encoder function 34 will initially buffer incoming samples, and when an input buffer of 160 samples is filled, various pre-processing operations may be provided. For example, certain least significant bits (LSBs) may be dropped from each of the samples and the resulting frame data may be high-pass filtered as desired to provide frame data that falls within the base bandwidth of 300-3400 Hz for telecom systems.

The resulting frames and data are then passed to a voice activity detection (VAD) function 52, which will determine whether the frame contains active speech or background noise. This determination, as those skilled in the art will appreciate, may be based solely on the given frame, as well as on preceding frames. The decision of the VAD function 52 is provided to an encoding control function 54, which will generally determine whether to employ low rate encoding or high rate encoding for the frame being processed. High rate encoding is provided by a high rate encoding function 48, while low rate encoding is provided by a low rate encoding function 50. The high rate encoding function 48 is generally used for active speech, while the low rate encoding function 50 is generally used for background noise. For active speech, the high rate encoding function 48 employs an encoding process wherein a relatively high number of parameters are encoded and transmitted to represent the active speech that is being encoded.

In contrast, the low rate encoding function 50 represents a simplified encoding mode, wherein significantly fewer parameters are encoded and transmitted to represent the background noise. Inherently, the low rate encoding function 50 will analyze the spectrum and relative level of the background noise and generate corresponding encoding parameters, which represent the background noise. These encoding parameters correspond to comfort noise, and are inherently provided by the low rate encoding function 50. For the present invention, the encoder function 34 is modified such that the encoding control function 54 further bases its decision to select low rate encoding by the low rate encoding function 50, or high rate encoding by the high rate encoding function 48 on the residual echo control signal $S_{REC}$, which is provided from the residual echo control function 40 of the echo cancellation circuitry 28.

System designers will recognize tremendous flexibility in using the residual echo control signal $S_{REC}$ to aid in the selection of either low rate encoding or high rate encoding for any given frame. Notably, the residual echo control signal $S_{REC}$ essentially indicates whether the residual echo control function 40 has determined that a particular sample should be replaced with comfort noise. As such, the encoding control function 54 may receive different instructions for different samples in a given frame. For example, certain samples in a frame may be associated with a residual echo control signal $S_{REC}$ that indicates the sample should be replaced with comfort noise, whereas other samples should not be replaced with comfort noise. However, the encoder function 34 provides encoding on a frame-by-frame basis, and not on a sample-by-sample basis. If each frame includes 160 samples, the entire block of 160 samples is encoded either using low rate encoding or high rate encoding, and the encoding control function 54 decides which rate to use based on logic provided by system designers. The logic may take into consideration various parameters, including the output of the VAD function 52 and the residual echo control signal $S_{REC}$. A few examples are now provided to illustrate various scenarios.

In the first example, assume that the residual echo control function 40 determined to replace 81 samples in the frame with comfort noise, and decided to leave the remaining 79 samples alone. If a simple majority-based voting scheme is employed, the encoding control function 54 may decide to use low-rate encoding since the residual echo control function 40 indicated that a majority of the samples should be replaced with comfort noise. Alternatively, the encoding control function 54 may decide to use high rate encoding for any frame that includes samples that should not be replaced with comfort noise according to the residual echo control signal $S_{REC}$. In one embodiment, the encoding control function 54 decides on low or high rate encoding for a given frame based on output from the VAD function 52 in general; however, these decisions may be overridden based on the residual echo control signal $S_{REC}$. For example, the encoding control function 54 may determine a frame that includes active speech based on current or prior input from the VAD function 52; however, the residual echo control signal $S_{REC}$ may indicate that each sample, or a majority of samples, should be replaced with comfort noise. As a result, the encoding control function 54 may override its normal decision and invoke low rate encoding by the low rate encoding function 50 for the given frame.

The present invention is applicable to virtually any system wherein a variable bit rate vocoder circuitry 30 follows associated echo cancellation circuitry 28. Preferably, the echo cancellation circuitry 28 and vocoder circuitry 30 are implemented in one or more digital signal processors (DSPs), and preferably reside on a single service node in the communication environment 10. However, the location of the echo cancellation circuitry 28 and vocoder circuitry 30 may be provided on any of the nodes in the communication environment 10, as well as any node along the communication path for the voice connection at issue. The present invention is particularly useful when the vocoder circuitry 30 employs discontinuous transmission (DTX) encoding techniques in a GSM or like implementation or ⅛ rate encoding in CDMA or like applications, such as those used in Enhanced Variable Rate Codec (EVRC or EVRC-B). For GSM, the low rate encoding function 50 may employ DTX processing and for CDMA, the low rate encoding function 50 may employ the ⅛ rate or like encoding for providing comfort noise corresponding to the appropriate background noise. Notably, the ⅛ rate is a reference to the effective encoding rate relative to the possible high rate encoding provided by the high rate encoding function 48. Although GSM and CDMA applications are described, those skilled in the art will recognize the benefits of the present invention in any type of variable bit rate or adaptive multi-rate echo cancellation and encoding scheme. For either GSM or CDMA applications, the present invention eliminates some of the built-in hangover issues that are associated with the respective encoding techniques.

Those skilled in the art will recognize improvements and modifications to the preferred embodiments of the present invention. All such improvements and modifications are considered within the scope of the concepts disclosed herein and the claims that follow.

What is claimed is:

1. A method, comprising:
buffering samples of an input signal;
detecting voice activity in the buffered samples;
selecting an encoding rate dependent upon the detected voice activity and a residual echo control signal; and
encoding the buffered samples using the selected encoding rate.

2. The method of claim 1, wherein selecting an encoding rate comprises choosing a high encoding rate responsive to the detected voice activity.

3. The method of claim 1, wherein buffering samples of the input signal comprises creating one or more frames.

4. The method of claim 3, wherein buffering the samples comprises performing pre-processing operations on a frame of the one or more frames.

5. The method of claim 4, wherein the pre-processing comprises performing a high-pass filter operation.

6. An apparatus, comprising:
a detection circuit configured to detect voice activity in an audio signal and generate a detection output;
an encoder control circuit coupled to the detection circuit, and configured to select an encoding rate responsive to the detection output and generate a control output;
a low-rate encoder circuit configured to encode the audio signal dependent upon the control output; and
a high-rate encoder circuit configured to encode the audio signal dependent upon the control output;
wherein the encoder control circuit is further configured to select an encoding rate dependent upon a residual echo control signal.

7. The apparatus of claim 6, wherein the encoder control circuit is further configured to select a high encoding rate responsive to the detection of voice activity.

8. The apparatus of claim 6, further comprising a buffer circuit configured to buffer samples of the audio signal.

9. The apparatus of claim 6, wherein the encoder control circuit is further configured to select a low encoding rate responsive to the detection of no voice activity.

10. A communications system, comprising:
a near-end communication terminal;
a far-end communication terminal; and
a service node coupled between the near-end communication terminal and the far-end communication terminal, wherein the service node comprises:
a detection circuit configured to detect voice activity in an audio signal to be transmitted between the near-end communication terminal and the far-end communication terminal, and generate a detection output;
an encoder control circuit coupled to the detection circuit, and configured to:
select an encoding rate responsive to the detection output and dependent upon a residual echo control signal; and
generate a control output;
a low-rate encoder circuit configured to encode the audio signal dependent upon the control output; and
a high-rate encoder circuit configured to encode the audio signal dependent upon the control output.

11. The system of claim 10, wherein the service node comprises a media gateway.

12. The system of claim 10, wherein the encoder control circuit is further configured to select a high encoding rate responsive to the detection of voice activity.

13. The system of claim 10, wherein the encoder control circuit is further configured to select a low encoding rate responsive to the detection of no voice activity.

14. The system of claim 10, wherein the service node comprises a base station.

15. A method, comprising:
- receiving, by a service node in a communication environment, an audio signal from a near-end terminal;
- sampling the audio signal;
- buffering the samples of the audio signal;
- detecting voice activity in the buffered samples;
- selecting an encoding rate dependent upon the detected voice activity;
- encoding the buffered samples using the selected encoding rate; and
- sending the encoded buffered samples to a far-end terminal;
- wherein selecting the encoding rate is further dependent upon a residual echo control signal.

16. The method of claim 15, wherein selecting an encoding rate comprises choosing a high encoding rate responsive to the detected voice activity.

17. The method of claim 15, wherein buffering the samples of the audio signal comprises creating one or more frames.

18. The method of claim 17, wherein buffering the samples further comprises performing a high-pass filter operation on at least one of the one or more frames.

* * * * *